(12) United States Patent
Desorbo et al.

(10) Patent No.: US 7,665,698 B2
(45) Date of Patent: Feb. 23, 2010

(54) ARTICULATED SUPPORT ASSEMBLY

(75) Inventors: Alexander P. Desorbo, Woodbury, CT (US); Carl Hultman, Derby, CT (US); James Markland, Stratford, CT (US)

(73) Assignee: Anton/Bauer, Inc., Shelton, CT (US)

( * ) Notice: Subject to any disclaimer, the term of this patent is extended or adjusted under 35 U.S.C. 154(b) by 0 days.

(21) Appl. No.: 12/103,858

(22) Filed: Apr. 16, 2008

(65) Prior Publication Data

US 2008/0251662 A1 Oct. 16, 2008

Related U.S. Application Data

(60) Provisional application No. 60/912,019, filed on Apr. 16, 2007.

(51) Int. Cl.
*F16M 11/04* (2006.01)

(52) U.S. Cl. .................................. 248/187.1; 396/419

(58) Field of Classification Search ............. 248/185.1, 248/160, 104, 176.1, 187.1, 279.1; 396/419, 396/420; 348/E7.087

See application file for complete search history.

(56) References Cited

U.S. PATENT DOCUMENTS

| | | | | |
|---|---|---|---|---|
| 4,244,500 A | * | 1/1981 | Fournier | 224/265 |
| 4,943,820 A | * | 7/1990 | Larock | 396/423 |
| 5,348,259 A | * | 9/1994 | Blanco et al. | 248/276.1 |
| 5,890,025 A | * | 3/1999 | Hart | 396/420 |
| 6,056,449 A | * | 5/2000 | Hart | 396/421 |
| 6,819,550 B2 | | 11/2004 | Jobs et al. | |
| 6,983,930 B1 | * | 1/2006 | La Mendola et al. | 269/45 |
| 7,168,666 B2 | * | 1/2007 | Tucker | 248/150 |
| 2001/0025905 A1 | * | 10/2001 | Carpenter et al. | 248/160 |
| 2005/0229467 A1 | * | 10/2005 | Sohn | 42/95 |
| 2006/0110155 A1 | * | 5/2006 | Kouchi et al. | 396/419 |
| 2006/0269276 A1 | | 11/2006 | O'Shea et al. | |
| 2007/0095990 A1 | * | 5/2007 | Park et al. | 248/200 |
| 2008/0093516 A1 | * | 4/2008 | Bevirt | 248/181.1 |

* cited by examiner

*Primary Examiner*—Ramon O Ramirez
(74) *Attorney, Agent, or Firm*—McCormick, Paulding & Huber LLP

(57) ABSTRACT

An articulating support assembly includes a first segment and a second segment. The first and second segments are disposed adjacent to one another. A first mating surface is defined on the first segment and a second mating surface is defined on the second segment. A tensioning assembly is operatively connected to the first and second segments such that the tensioning may be selectively operable to bias the first mating surface and the second mating surface into contact with one another thereby holding the first segment in a predetermined static orientation with respect to the second segment.

13 Claims, 9 Drawing Sheets

ARTICULATED SUPPORT ASSEMBLY

CROSS REFERENCE TO RELATED APPLICATIONS

This application claims the benefit of U.S. Provisional Application Ser. No. 60/912,019, filed on Apr. 16, 2007, and herein incorporated by reference in its entirety.

FIELD OF THE INVENTION

The present invention relates generally to an articulated support assembly, and deals more particularly with an articulated support assembly for accessories that are supported at the distal end thereof, and that employ a segmented extension arm and integrated clamping mechanism to selectively and releasably define a rigid support extension for these accessories.

BACKGROUND OF THE INVENTION

It is often necessary or desired to support an accessory of some type at the end of a supporting structure. This need is common to many fields, including but not limited to the optical recording art, the hand tool art and in supporting flat-panel televisions and the like.

One of the major challenges faced in the optical recording arts is the filming of moving objects or activities, e.g., while skiing, while maintaining stabilization of the camera. To address this, many modern video cameras have built-in electronic image stabilizing circuitry. While these circuits are helpful in reducing the minor fluctuations of camera movement, they cannot distinguish between purposeful movement of the camera and accidental movement as a result of operator fatigue. Moreover, the frequent use of long lenses and digital zoom capabilities of cameras requires the physical stabilization of the camera in order to minimize the camera's movement which otherwise would result in image shifts several times that of the camera movement.

Various solutions are available to assist with this problem, for example, tripods, monopods, and different types of frame assemblies. Tripods can stabilize the camera movement but restrict portability. Frame assemblies for mounting cameras on the human body for stabilization are typically not designed for the size, weight and ergonomics of smaller handheld digital cameras.

Older video cameras, by example, are typically larger and heavier than modern cameras, which required them to be rested directly on the operator's shoulders. The viewfinder of these cameras was positioned outboard of the camera body and toward the operator thereby placing it in a natural position in front of the operator's eye. The overall weight of the camera was borne on the operator's shoulder with the center of gravity of the camera being placed on the point of the operators shoulder. Thus although larger and heavier, these devices were more stable and manageable during operation.

With the advent of smaller "palm-sized" handheld camcorders, all of the camcorder's weight is borne on the operators' arm in front of his body. Known shoulder mounting assemblies are insufficient in locating a wide variety of cameras upon the shoulder of an operator as differences in the wide range of models and manufacturers often places the viewfinder off-line from the operator's eyes requiring tedious readjustment of the shoulder mount.

Moreover, during prolonged filming, the ergonomics of these known shoulder mounted camcorder designs often contribute to operator fatigue and camera instability due to their size and weight and inability to easily adjust camera positioning, thereby reducing the quality of the recorded images as a result.

An example of a frame assembly for supporting a camera is disclosed in U.S. Pat. Nos. 5,890,025 and 6,056,449 issued to Hart. The assembly is comprised of a rigid frame having a front and a rear portion with a pair of shoulder rests constructed to rest on the shoulders of the wearer. This type of device has the disadvantage of being bulky, cumbersome and heavy, defeating the ergonomics and the performance of the small handheld cameras or camcorders.

Still other frame assemblies have been proposed in the art, however each of these previously known systems suffer from a lack of flexibility in the operational positioning of the various optical device mounted thereon.

It is also known to support various hand-tool devices, e.g., spot-lights, at the end of deformable support arms, such as Black & Decker's® 'Snake Light'®. These known deformable arms are essentially simple bars crafted from one of a number of pliable materials, which permit deformation along their length, and are adapted to support integral accessories at their distal ends.

While effective to a certain degree, these known deformable arms are restricted to supporting accessories whose operation does not incur an off-axis force upon the material of the deformable arm that would otherwise cause the deformable arm to bend. Thus, the amount of weight that known deformable arms can support at their distal ends is directly related to the specific material composition or assembled construction from which the deformable arm is crafted. As known deformable arms are fashioned to be easily bent into a desired shape by a user exerting a relatively minor off-axis force, these known devices are intrinsically limited to supporting accessories that are relatively light in weight or static in operation (thus, to support accessories that were massive in weight or dynamic in operation (such as a camera being carried by an operator), the bar of a deformable arm assembly would need to be proportionally and therefore, prohibitively larger in diameter, or fashioned from a material that would be proportionally difficult or even impractical for users to readily bend by their own hand).

Apart from the hand-tool art, it is precisely this limitation on known deformable arm assemblies that requires that support arms for, e.g., flat-panel televisions be crafted from rigid and non-deformable elements.

With the forgoing problems and concerns in mind, it is the general object of the present invention to provide an articulated support assembly which overcomes the above-described limitations on the weight-bearing capacity of the assembly, while maintaining the ability of the support assembly to be deformed into varied shapes and contours, as desired by a user.

SUMMARY OF THE INVENTION

It is one object of the present invention to provide an articulated support assembly for supporting accessories.

It is another object of the present invention to provide an articulated support assembly that is deformable into varied shapes and contours and retained in those shapes and contours by increasing the tensile force applied to the component elements of the arm.

It is another object of the present invention to provide an articulated support assembly that is deformable into varied shapes and contours, and whose weight-bearing capabilities are not directly proportional to the material or construction from which the support assembly is crafted.

It is another object of the present invention to provide an articulated support assembly for supporting an optical recording apparatus, such as a camera or a camcorder.

It is another object of the present invention to provide an articulated support assembly for supporting a camera or a camcorder that allows weight of the camera to be redirected to the operator's shoulder and body.

It is another object of the present invention to provide an articulated support assembly for supporting a camera or a camcorder which is lightweight, portable, stable, easily manipulated by the operator and which can be held in place in a newly manipulated position.

It is another object of the present invention to provide an articulated support assembly that includes a segmented extension arm that may selectively and releasably define a rigid support extension for optical devices.

It is another object of the present invention to provide an articulated support assembly that includes a mid-should break point, so as to enable pivoting of the optical device attached to the segmented extension arm.

It is another object of the present invention to provide an articulated support assembly that utilizes a friction-coupled clamming mechanism to secure the support assembly to an operator's body.

Another objective of the invention is to provide a shoulder mounted camera support with collapsible or detachable members thereby requiring minimal storage space and is easily assembled or disassembled for flexible use with a variety of cameras or camcorders.

A further objective of the present invention is to provide a shoulder mounted camera support with means to attach the camera or camcorder camera mount securely yet capable of quick release for operation in a variety of recording situations and applicable to a variety of cameras.

These and other objectives of the present invention, and their preferred embodiments, shall become clear by consideration of the specification, claims and drawings taken as a whole.

BRIEF DESCRIPTION OF THE DRAWINGS

Further objectives and advantages of the invention will become more apparent from the following description and claims, as from the accompanying drawings, wherein:

DETAILED DESCRIPTION OF THE PREFERRED EMBODIMENT

Figure 1:
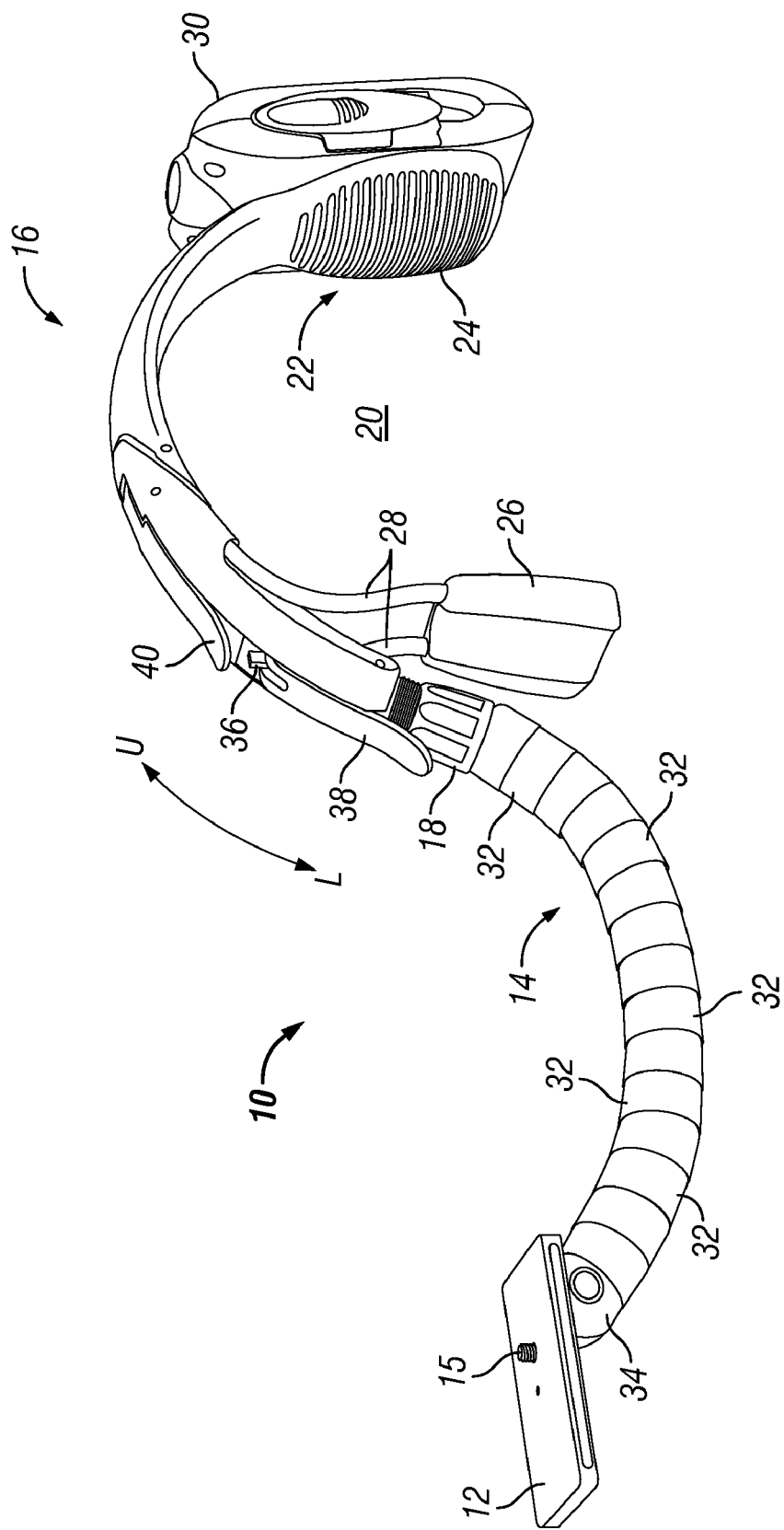
FIG. 1 illustrates a support apparatus for an optical device having an articulating tensioned extension arm, according to one embodiment of the present invention.

An articulating support apparatus 10 for supporting accessories is shown in FIG. 1, according to one embodiment of the present invention. As shown in FIG. 1, the articulating support apparatus 10 includes a mounting platform 12 disposed on the distal end of a segmented extension arm 14.

As will be appreciated, the articulated support apparatus 10 may releasably support a plurality of optical devices, hand-tools, video monitors, light fixtures or the like, on a distal end such as at the support platform 12, via operation of the threaded attachment screw 15 extending therethrough. Alternative attachment means other than the threaded attachment screw 15 may also be utilized without departing from the broader aspects of the present invention.

Returning to FIG. 1, the segmented extension arm 14 is connected on its other distal end to a shoulder mount 16, via a threaded attachment collar 18. The shoulder mount 16 defines an approximately hemispherical space 20, within which an operator may place their shoulder. The rear of the should mount 16 includes a back bracing member 22, which is may be formed as a widened section of the shoulder mount 16 having a plurality of shock absorbing ribs 24 formed thereon.

A front breast plate 26 is also shown in FIG. 1. The front breast plate 26 is attached to the shoulder mount 16 via a pair of deformable rods 28. As will be appreciated, and once an operator's shoulder area is placed within the shoulder mount 16, the deformable rods 28 may be manually bent so as to capture the torso of the operator between the front breast plate 26 and the back bracing member 22.

In this manner, the articulating support apparatus 10 of the present invention is capable of closely conforming to the shoulder and torso of an operator, while being capable of accommodating operators of differing proportions.

Also shown in FIG. 1 is the ability of the support apparatus 10 to offset the weight of an accessory mounted to the support platform 12, by providing an attachment surface on the rear side of the back bracing member 22. As shown in FIG. 1, a battery unit 30 is releasably mounted to the rear side of the back bracing member 22, and provides thereby a counter-weight to any optical device mounted to the support platform 12. It will be readily appreciated that any particular battery pack, dead weight or additional accessory may be alternatively mounted to the rear side of the back bracing member 22, without departing from the broader aspects of the present invention.

As shown, the extension arm 14 is formed from a plurality of interacting segments 32. Each of the segments 32 define two opposing, and preferably substantially arcuate, faces (i.e., mating surfaces) which releasably mate with matching faces of segments disposed adjacent thereto. Most preferably, and as is shown in more detail in relation to FIG. 9, both of the two opposing faces of the segments 32 have defined thereon a plurality of lands 50 and grooves 52, such that the lands of one segment 32 can be fixedly yet releasably accommodated within the grooves of an adjacent segment 32, and visa-versa. When tensioned together in an axial direction (as will be discussed in more detail later), the lands and grooves of each of the segments 32 are caused to interact with one another such that the extension arm 14 defines a predetermined static orientation. That is, once tensioned together in an axial manner, the axially-induced tension in combination with the lands and grooves of the segments 32 will prohibit the relative movement of segments 32 with respect to one another, and the extension arm 14 can thereby maintain a pre-determined configuration.

It is therefore an important aspect of the present invention that the support apparatus 10 of the present invention is capable of providing a platform 12 upon which an accessory may be mounted. Moreover, the platform 12 of the present invention may be held at any desired angle or elevation by the selective operation and tensioning of the segments 32. In this manner, the present invention gives a measure of both flexibility and rigidity that has heretofore been absent from the prior art.

The tensioning mechanism of the present invention is preferably comprised of a tensioning wire that extends through a center aperture 54 (again, shown best in FIG. 9) formed in the body of the segments 32. The tensioning wire is fixedly secured within a first end segment 34, extends through the center of the other segments 32, and is finally attached to a cam end 36 of a locking lever 38. As shown in FIG. 1, the locking lever 38 is capable of being pivoted in the unlocking (U) direction, or the locking (L) direction. When the locking lever 38 is pivoted in its unlocking direction, the tensioning wire is permitted to relax, and so the segments 32 are freed from their axial tension and the extension arm 14 relinquishes its rigid profile. Conversely, when the locking lever 38 is pivoted in its locking direction, the cam end 36 of the locking lever 38 pulls the tensioning wire such that the segments 32 are all squeezed together, thus providing an axial tensioning force and fixing the position of each of the segments 32 with respect to one another.

It will therefore be readily appreciated that the extension arm 14 of the present invention may be selectively and releasably tensioned so as to define any desired support profile, shape or contour. That is, it can be seen, e.g., in FIGS. 1 and 3, that the segments 32 of the extension arm 14 have been axially tensioned to define a substantially U-shaped profile. While the locking lever 38 remains in its locked position, the tensioning wire will remain tensioned, and thus the mating surfaces, in this case, the lands and grooves of adjacent segments 32 will remain engaged with one another. It can be readily appreciated that differently configured mating surfaces of the segments, such as dimples and corresponding recesses, or a dimpled surface mating to a compressible opposite surface, can provide the necessary interference between the segments to form a rigid assembly when torsional force is applied.

It is therefore yet another important aspect of the present invention that the extension arm 14 may be quickly reconfigured merely by pivoting the locking lever 38 to its unlocked position, and adjusting the relative position and thus the profiles of the interconnecting segments 32. Once positioned in their desired contour, the operator can then simply pivot the locking lever 38 to is locked position, and the extension arm 14 (under the axial tension of the tensioning wire) will maintain the desired profile.

Figure 2:
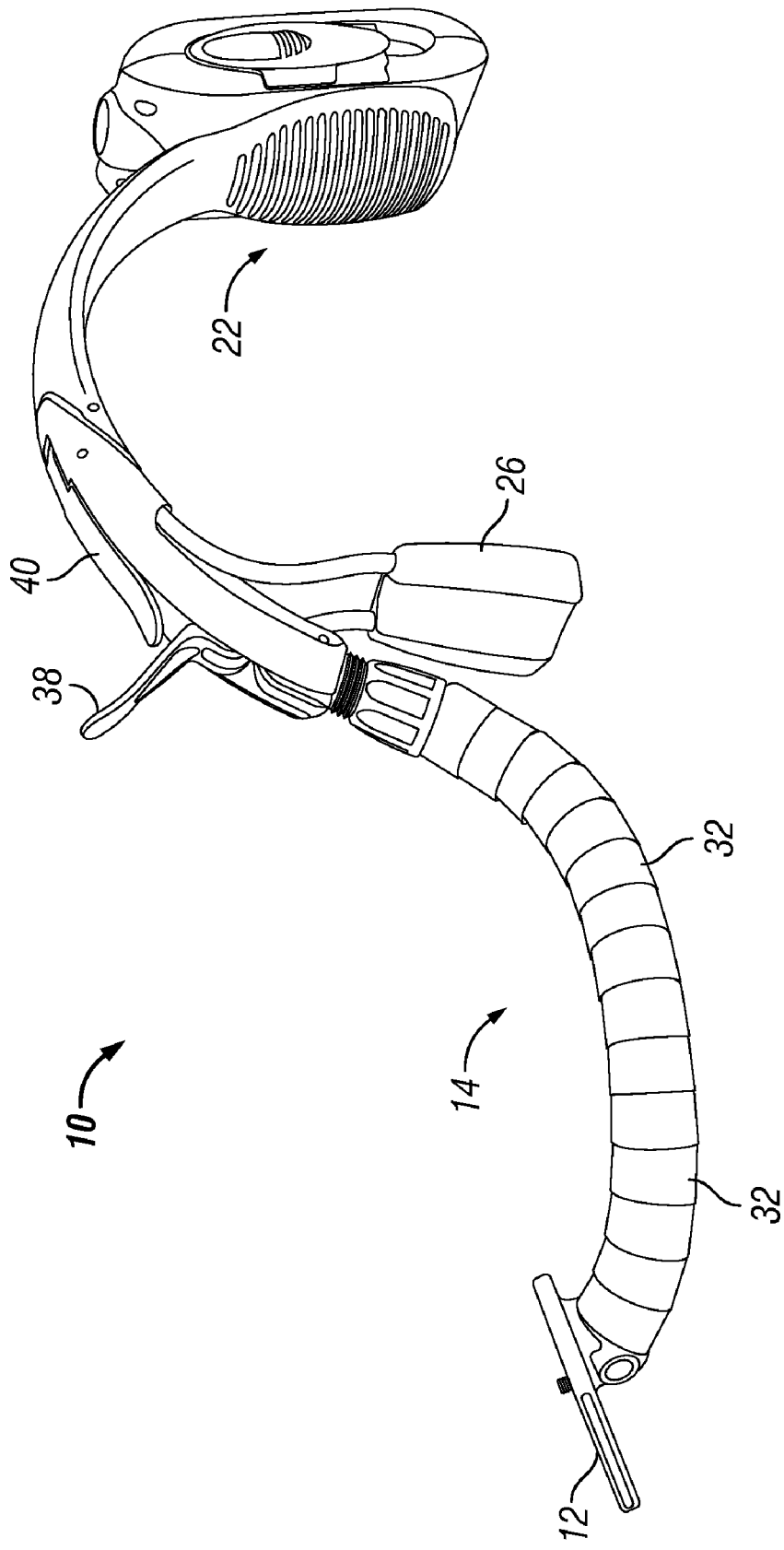
FIG. 2 illustrates a support apparatus in which the extension arm is in its un-tensioned state.

FIG. 2 offers one example of the extension arm 14 in its relaxed state. As seen in FIG. 2, the locking lever 38 has been moved to its unlocked position, thus removing the axial tension from the tensioning wire and permitting the lands and grooves of adjacent segments 32 to disengage from one another.

Figure 3:
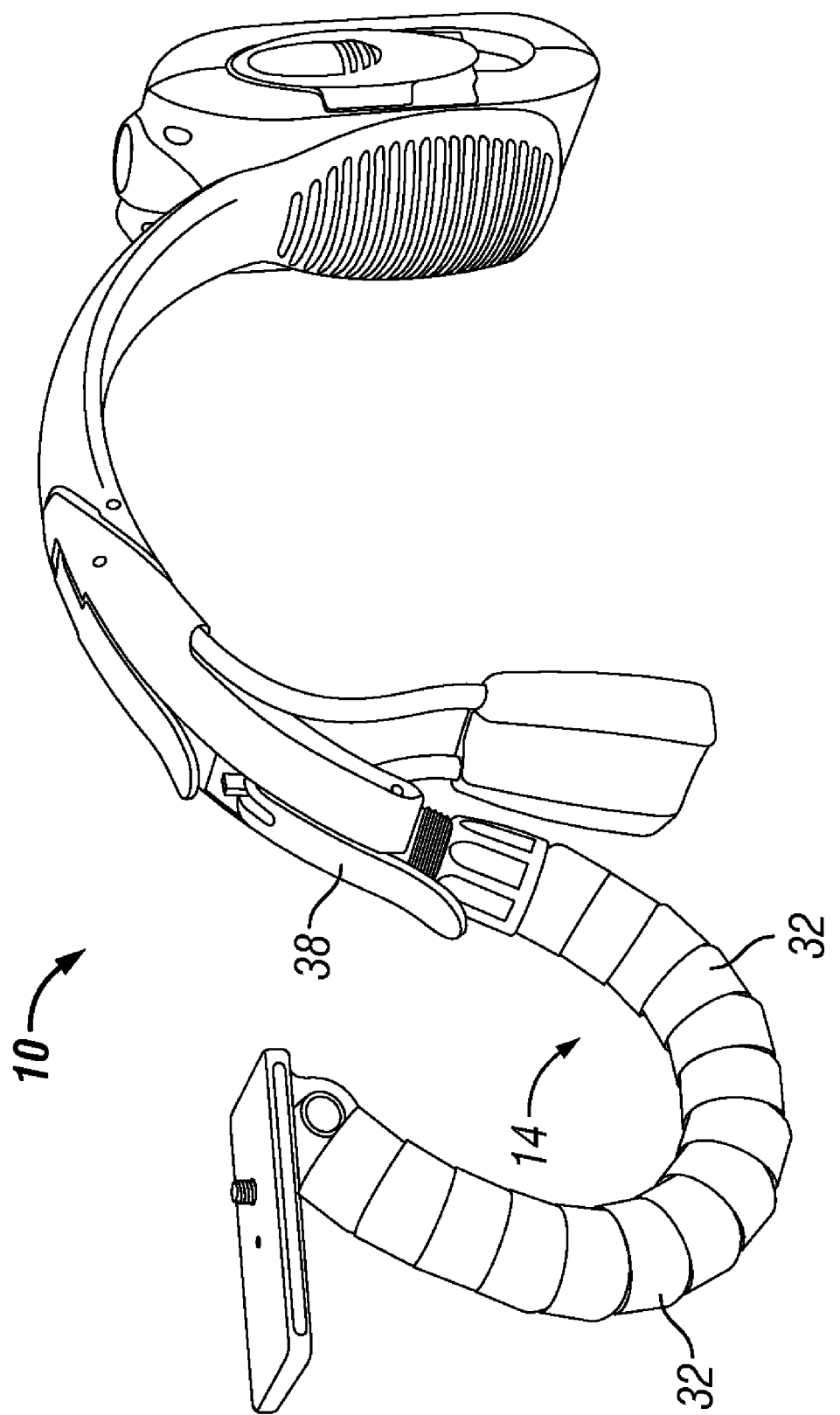
FIG. 3 illustrates a support apparatus for an optical device having an articulating tensioned extension arm defining an alternative support profile.

FIG. 3 illustrates the extension arm 14 which has been secured to define yet another support profile. As shown in FIG. 3, the segments 32 of the extension arm 14 have been positioned to define a narrow-U profile, while the locking lever 38 has been moved to its locked position. In doing so, the locking lever 38 will cause the tensioning wire to axially compress each of the segments 32 against one another, thus causing their mating surfaces, in this embodiment lands and grooves to interact and hold the desired narrow-U support profile.

Figure 4:
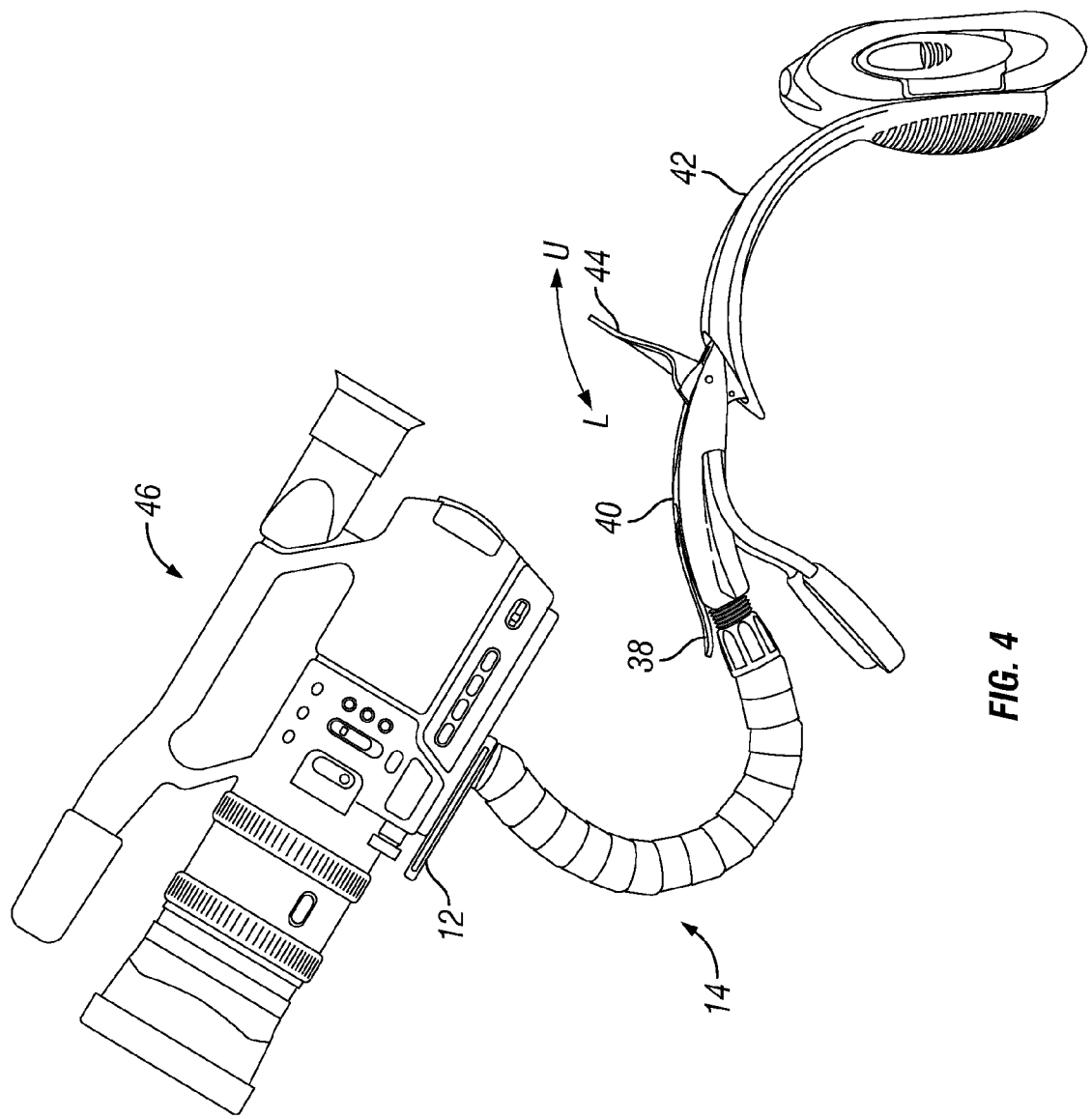
FIG. 4 illustrates an articulating support apparatus supporting an optical device and illustrating a pivotable first portion, according to another embodiment of the present invention.

FIG. 4 illustrates yet another aspects of the present invention. As shown in FIG. 4, the shoulder mount 16 is preferably formed to have a first portion 40 pivotably connected to a second portion 42. A break lever 44 is provided and, when pivoted to its unlocked position, U, enables the first portion 40 of the shoulder mount 16 to pivot with respect to the second portion 42.

It is therefore yet another important aspect of the present invention that the shoulder mount 16 may be partially pivoted in order to enable, e.g., altitude filming without having to remove, e.g., an optical device from the platform 12, or causing the operator to bend over backwards. That is, once the support apparatus 10 has been mounted onto the shoulder area of an operator, the operator need only move the break lever 44 to is unlocked position to enable the first portion 40 to pivot freely, under the manual control of the operator. Once the necessity for altitude filming has passed, the operator may simply move the break lever 44 to its locked position, L, to again rigidly define the support profile of the support apparatus 10.

Figure 5:
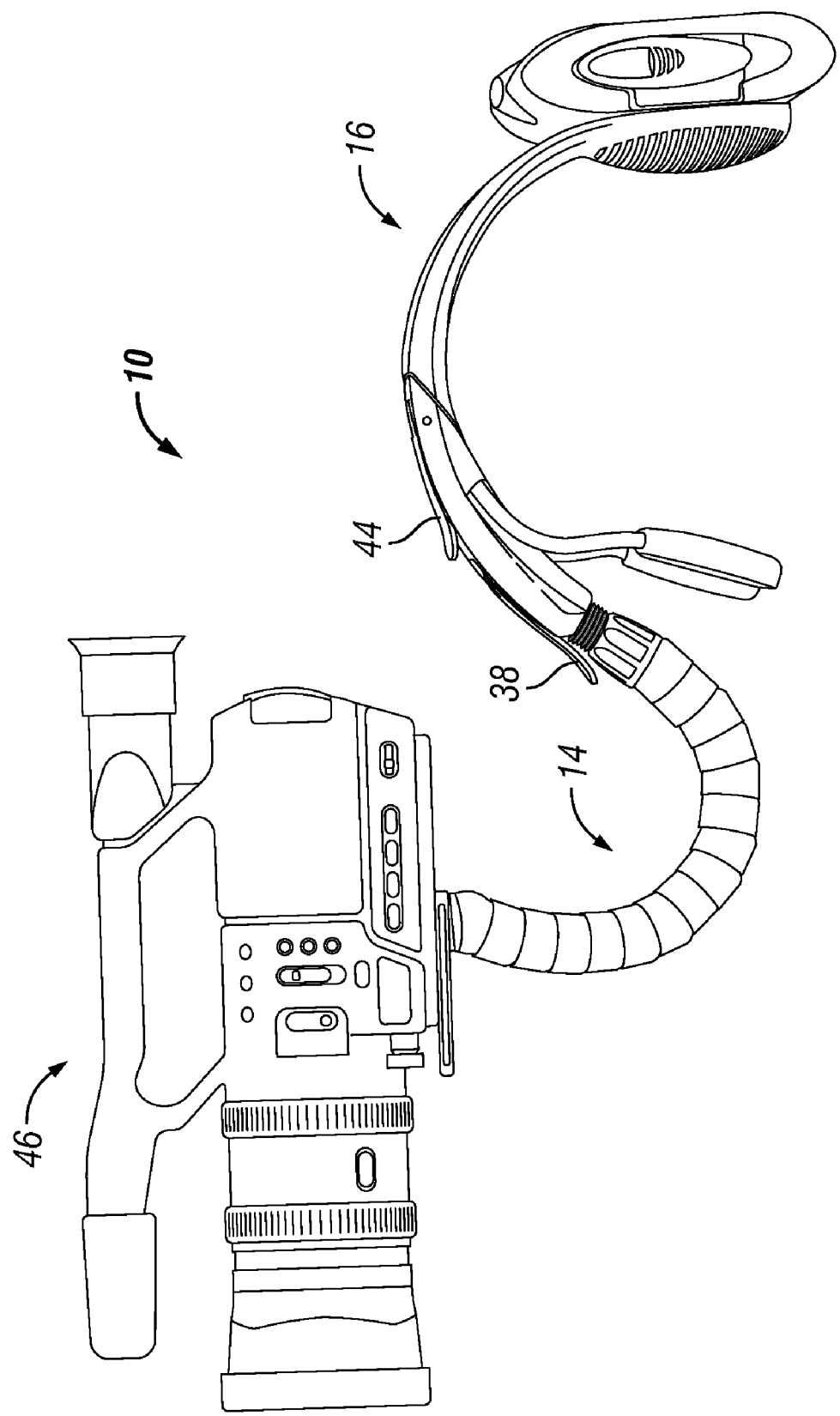
FIG. 5 illustrates a side view of the articulating support apparatus shown in FIG. 4, in which the pivotable first portion is in its locked state, and the support apparatus is in a free-standing configuration.
Figure 6:
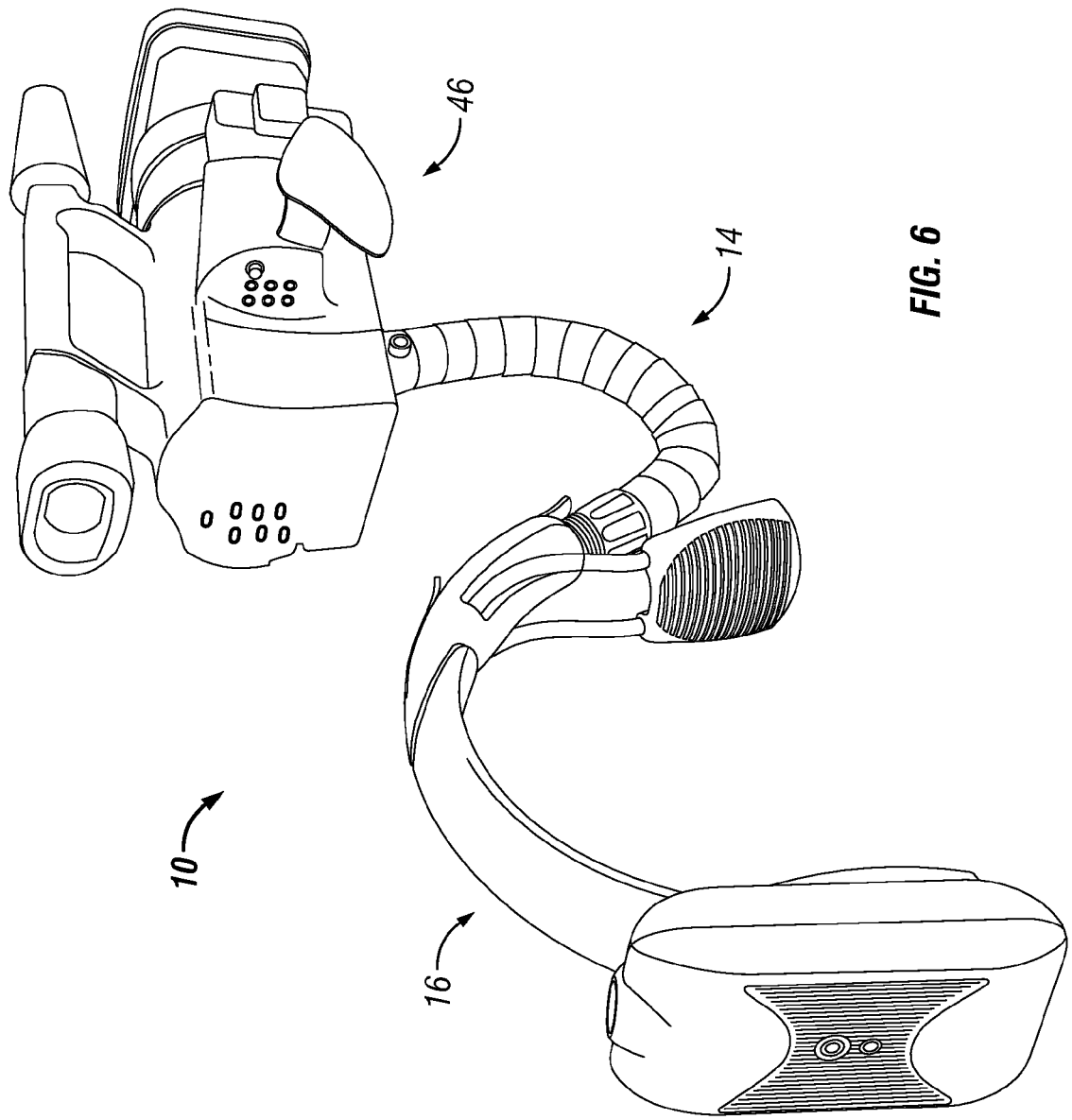
FIG. 6 illustrates a rear view of the articulating support apparatus shown in FIG. 5.
Figure 7:
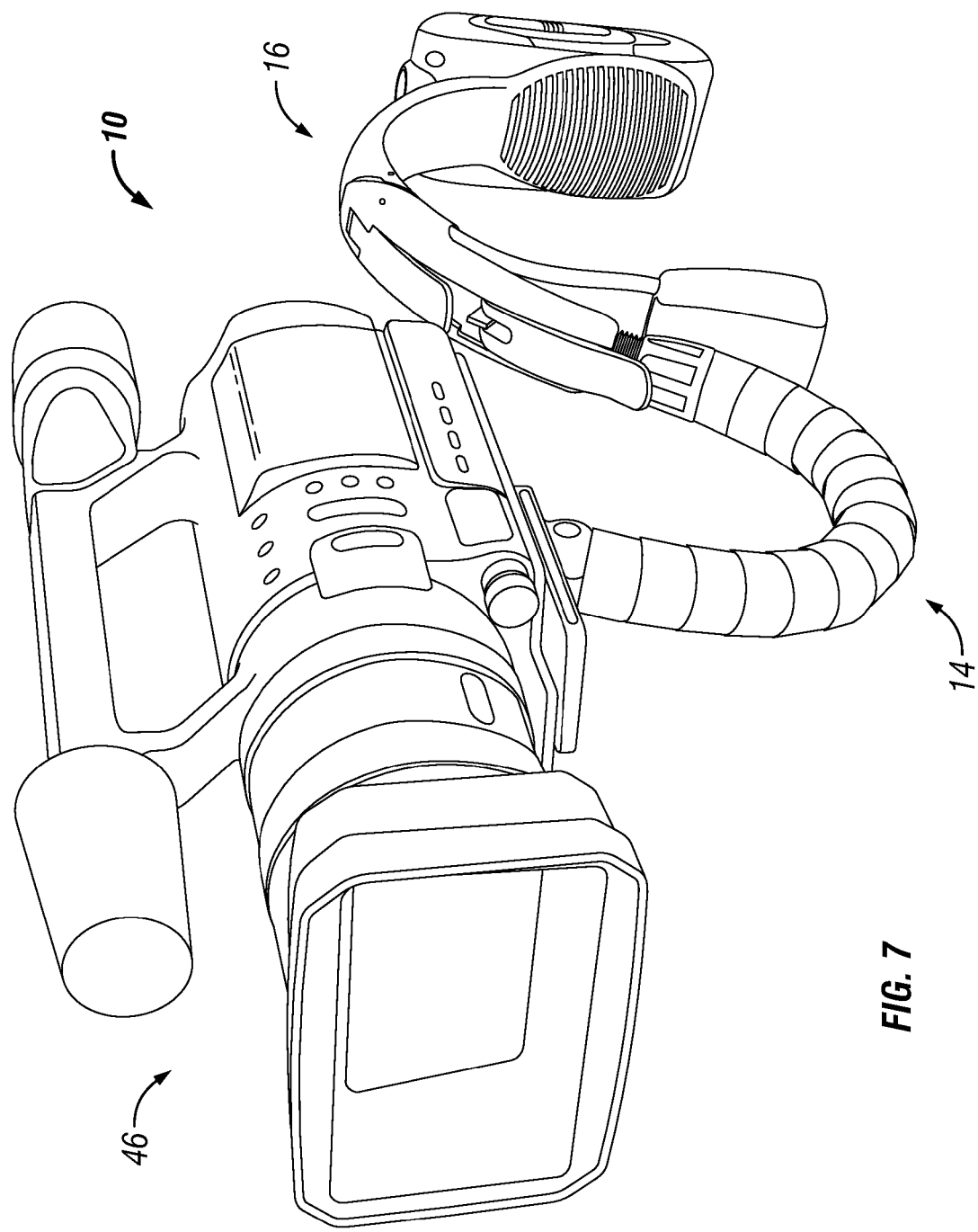
FIG. 7 illustrates a front view of the articulating support apparatus shown in FIG. 5.

In addition to providing an extension arm 14 being capable of defining a practically infinite number of selectively rigid support profiles/contours, as well as providing a pivoting capability, the support apparatus 10 of the present invention may also be utilized to provide a free-standing support for, e.g., an optical apparatus, hand-tool or television. As best seen in FIGS. 5-7, an optical device (video camera) 46 may be supported with minimal assistance from an operator.

It is an important aspect of the present invention that, unlike known deformable arm assemblies, the amount of weight that the articulated support assembly 10 of the present invention can support at its distal end is not limited by the specific material or physical construction of the segments 32 of the extension arm 14. That is, the weight that the articulated support assembly 10 can support at its distal end is increased as a function of the amount of axial tension created by the tension wire.

Thus, it will be readily appreciated that the greater the axially-induced force created by the tensioning wire, the greater extent to which the individual segments 32 of the extension arm 14 will be tensioned towards one another. In this manner, if the tensioning wire is designed to create a first amount of axially-induced force, the extension arm 14 will be able to support a first maximum weight in direct relation thereto. Likewise, if the tensioning wire is designed to create a second, and greater, amount of axially-induced force, the resultant extension arm 14 will be able to support a second maximum weight that can be larger than the first maximum weight. As will be appreciated, this relationship between the axially-induced force of the tensioning wire, and the maximum weight that the extension arm 14 can support without destroying the desired profile/contour of the extension arm 14 itself, is independent of the material each individual segment 32 is crafted from.

It is therefore an important aspect of the present invention that the maximum weight that the extension arm 14 can support may be altered as the axially-induced force of the tensioning wire is increased, or decreased. The present invention also envisions that the cam end 36 of the locking ever 38 may be formed such that the amount of axially-induced force may be altered (either greater or lesser) by action of the user, as desired. This can be accomplished in one manner by having a plurality of discreet 'stops' in the pivoting of the locking lever 38, thereby generating a variable amount of axially-induced force to the tensioning wire and, accordingly, varying the maximum weight capable of being supported by the extension arm 14 without destroying the manipulated profile/contour of the extension arm 14.

Figure 8:
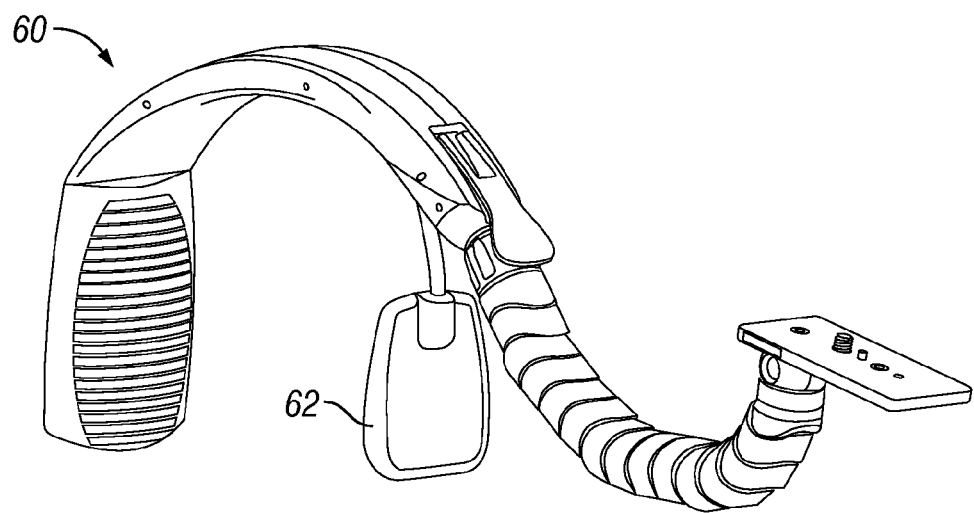
FIG. 8 illustrates an articulated support assembly according to yet another embodiment of the present invention.

FIG. 8 illustrates an articulating support assembly 60 according to yet another embodiment of the present invention. As shown in FIG. 8, the articulated support assembly 60 includes a breast plate 62 being attached to the articulated support assembly 60 via a single deformable rod 64, but is otherwise substantially similar to the articulated support assembly 10 of the preceding embodiments.

Figure 9:
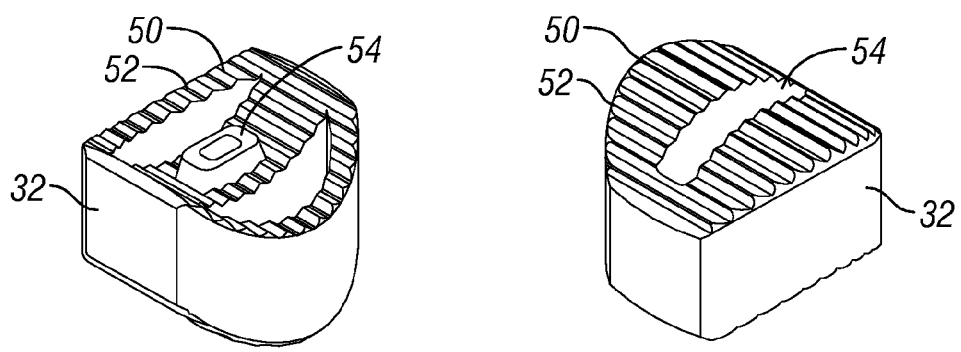
FIG. 9 illustrates an enlarged view one embodiment of the individual segments of the segmented extension arm of the preceding embodiments.

As discussed previously, FIG. 9 illustrates an enlarged view of the individual segments 32 of the segmented extension arm 14 of the embodiments of FIGS. 1-8. The matching lands 50 and grooves 52, as well as the center aperture 54 through which the tensioning wire is positioned, are shown in FIG. 9.

While a series of lands 50 and grooves 52 have been shown in connection with the embodiments of FIGS. 1-8, the present invention is not so limited in this regard. Indeed, whether the mating surfaces of adjacent segments 32 are formed to have lands 50 and grooves 52, or whether they define alternative profiles such as pimples and dimples, or the like, all such alternative embodiments are within the scope of the present invention. That is, given that the ability of adjacent segments 32 to remain in a static structural relationship with respect to one another is a function of the axially-induced force generated by the tensioning wire, the specific structure/profile of the mating surfaces of adjacent segments 32 may be altered from the lands 50 and grooves 54 shown in FIGS. 1-9, without departing from the broader aspects of the present invention.

Figure 10:
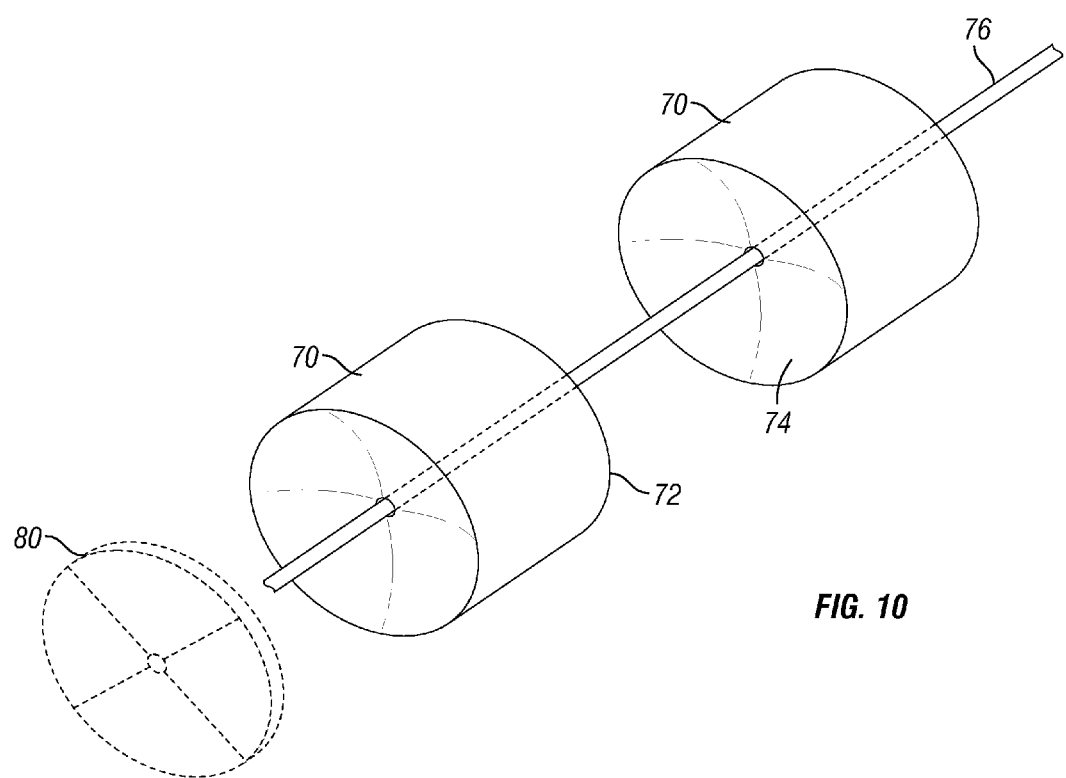
FIG. 10 illustrates an enlarged view of individuals segments of a segmented extension arm, according to yet another embodiment of the present invention.

FIG. 10 illustrates an enlarged view of individual segments 70 of a segmented extension arm 14, according to yet another embodiment of the present invention. As shown in FIG. 10, the segments 70 may themselves be formed from a somewhat compressible, yet resilient, material (such as, but not limited to a soft plastic or polymer). As with embodiments previously discussed, actuation of the locking lever 38 will cause the tensioning wire 76 to act as a tensioning means to produce an axially-induced force and thereby bias the mating surfaces 72/74 of adjacent segments 70 into contact with one another. Provided that the axially-induced force is high enough, the adjacent segments 70 will therefore be held in a structurally static relationship with respect to one another, thus maintaining the shape/contour of the segmented extension arm 14.

It will therefore be readily appreciated that even without defining specific, or even any, lands, grooves, or any such like structure upon the mating surfaces 72/74 of the segments 70, the axially-induced force created by the tensioning wire 76 can compress the body of each segment 70 into its adjacent segment 70 creating a frictional interference such that the segments 70 will define, as a whole, a substantially rigid shape/contour to the segmented extension arm 14.

As also shown in FIG. 10, the mating surfaces 72/74 of adjacent segments 70 are formed different from the mating surfaces as shown in the segments 32, best seen in FIG. 9. That is, the mating surfaces 72/74 are formed as substantially smooth and matching convex/concave surfaces, having no structural or outwardly extending structures formed thereon. With such non-descript yet compressible profiles, the mating surfaces 72/74 permit adjacent segments 70 to be held at slightly off-axis relationships with respect to one another, thus enabling the segmented extension arm 14 to 'bend' in any direction (the segments 32 being largely incapable of enabling the segmented extension arm 14 of, e.g., FIG. 8 from being 'bent' in a direction parallel to the running of the lands/grooves 50/52). Although a convex/concave relationship has been described, it will be readily appreciated that any similar configuration (such as, but not limited to, a ball-and-socket configuration) may be alternatively employed without departing from the broader aspects of the present invention.

FIG. 10 also illustrates a compressible pad 80 which may be mounted, glued or integrally molded to the mating surfaces 72/74 of the segments 70. In such an alternative embodiment, the segments 70 themselves need not be formed from compressible materials, instead relying upon the compressible pads 80 to provide the compression and frictional force between adjacent segments 70 that is needed to fix adjacent segments 70 in a static structural relationship with respect one another after being axially tensioned by the tensioning wire 76. Thus, it is possible to fabricate the body portion of the segments 70 from a substantially rigid and uncompressible material (for integral strength or resistance to environmental assault), while mounting the compressible pad 80 to the mating surfaces 72/74.

Regardless of whether the entire segment 70 is formed from a compressible material, or whether it is only the mounted/integral pad 80 which is compressible to a given degree, the maximum weight that the resultant segmented extension arm 14 may support at its distal end is still increased in relation to the axially-induced force of the tension wire 76, and may be controlled or varied as discussed previously.

It will also be readily appreciated that although the embodiments of FIGS. 1-10 have been discussed in relation to an articulated support apparatus 10/60 that may be adapted to hang about the shoulder, waist, (or other) portion of a user's body, the present invention is so limited in this regard. Indeed, instead of anchoring the segmented extension arm 14 to a shoulder mount 16 via the attachment collar 18, it is also envisioned that the segmented extension arm 14 may instead be anchored to a structure such as a wall, post or beam.

In this manner, the segmented extension arm 14 may have its distal end adjacent the locking lever 38 fixed to, e.g., a wall such that a flat-panel television (or other accessory) may be supported on the mounting platform 12. Thus, by adjusting the axially-induced force of the tensioning wire 76, it is possible to support accessories of varying weights, including accessories having relatively large weights.

As will be appreciated by a review of the embodiments and description of FIGS. 1-10, the articulated support assembly of the present invention provides a heretofore unknown segmented extension arm 14 wherein the maximum weight of the accessories that can be supported by the segmented extension arm 14 (without destroying its predetermined configuration) is no longer limited by the intrinsic material or mechanical properties of the material from which the integral components of the segmented extension arm 14 are formed. In this manner, and by merely adjusting the axially-induced force generated by the tensioning of the tensioning wire 76, the segments of the segmented extension arm can be fixed in a static structural relationship with respect to one another. Thus, the articulating support assembly of the present invention can be made more lightweight and small in size, without sacrificing any flexibility to be formed into a desired shape/contour. Moreover, the articulating support assembly of the present invention can support a weight that is proportionally greater than the mechanical structural and frictional interaction inherent to and between the segments.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. An articulated support assembly, comprising:
a first segment;
a second segment, said first and said second segments being disposed adjacent to one another;
a first mating surface defined on said first segment;
a second mating surface defined on said second segment; and
a tensioning means operatively connected to said first and said second segments, such that said tensioning means is selectively operable to increasingly bias said first mating surface and said second mating surface into contact with one another thereby holding said first segment in a predetermined static orientation with respect to said second segment,
wherein said first and said second segments are formed from a compressible material, such that said first and said second segments deform one another when said first mating surface is biased into contact with said second mating surface.

2. The articulated support assembly of claim 1, wherein:
said tensioning means includes a wire, wherein a first distal end of said wire is secured to one of said first and said second engaging members; and
a second distal end of said tensioning wire is operably connected to a locking lever for selective tensioning of said tensioning wire.

3. The articulated support assembly of claim 2, wherein: said tensioning wire is threaded through an aperture formed in said first and said second segments.

4. The articulated support assembly of claim 1, wherein:
said first and said second mating surfaces define matching convex and concave surfaces.

5. The support assembly of claim 1, further comprising: a support platform disposed adjacent to one of said first and said second segments.

6. An articulated support assembly, comprising:
a first segment;
a second segment, said first and said second segments being disposed adjacent to one another;
a first mating surface defined on said first segment;
a second mating surface defined on said second segment; and
a tensioning means operatively connected to said first and said second segments, such that said tensioning means is selectively operable to increasingly bias said first mating surface and said second mating surface into contact with one another thereby holding said first segment in a predetermined static orientation with respect to said second segment,
wherein said first and said second mating surfaces define a series of matching lands and grooves.

7. An articulated support assembly, comprising:
a first segment;
a second segment, said first and said second segments being disposed adjacent to one another;
a first mating surface defined on said first segment;
a second mating surface defined on said second segment; and
a tensioning means operatively connected to said first and said second segments, such that said tensioning means is selectively operable to increasingly bias said first mating surface and said second mating surface into contact with one another thereby holding said first segment in a predetermined static orientation with respect to said second segment; and
a compressible pad interposed between said first and second mating surfaces.

8. A method for supporting an accessory at a distal end of an articulating support arm assembly, said method comprising the steps of:
forming said articulated support arm assembly from a plurality of adjacent segments;
forming a mounting means adjacent said distal end of said articulated support arm assembly, said mounting means adapted to support said accessory thereon;
operably connecting a tensioning means through said plurality of adjacent segments;
axially tensioning said plurality of adjacent segments into contact with one another by selectively actuating said tensioning means such that said plurality of adjacent segments are held in a predetermined static orientation with respect to one another; and
increasing a maximum weight of said accessory that said articulated support arm assembly can support without destroying said predetermined static orientation by increasing a force of said axial tensioning,
wherein said plurality of adjacent segments are formed from at least one compressible material.

9. The method for supporting an accessory at a distal end of an articulated support arm assembly according to claim 8, said method further comprising the steps of:
defining a mating topography on convex and concave mating surfaces on said plurality of adjacent segments.

10. The method for supporting an accessory at a distal end of an articulated support arm assembly according to claim 8, said method further comprising the steps of:
forming a pad of compressible material; and
mounting said pad to said mating surfaces of said segments.

11. The method for supporting an accessory at a distal end of an articulated support arm assembly according to claim 8, said method further comprising the steps of:
forming a pad of compressible material; and
interposing said pad between opposing ends of said adjacent segments.

12. The method for supporting an accessory at a distal end of an articulating support arm assembly according to claim 11, said method further comprising the steps of:
defining a mating topography on the convex and concave mating surfaces on said plurality of adjacent segments.

13. The method for supporting an accessory at a distal end of an articulating support arm assembly according to claim 8, said method further comprising the steps of:
defining a series of matching lands and grooves on said plurality of adjacent segments.

* * * * *